Figure 1:
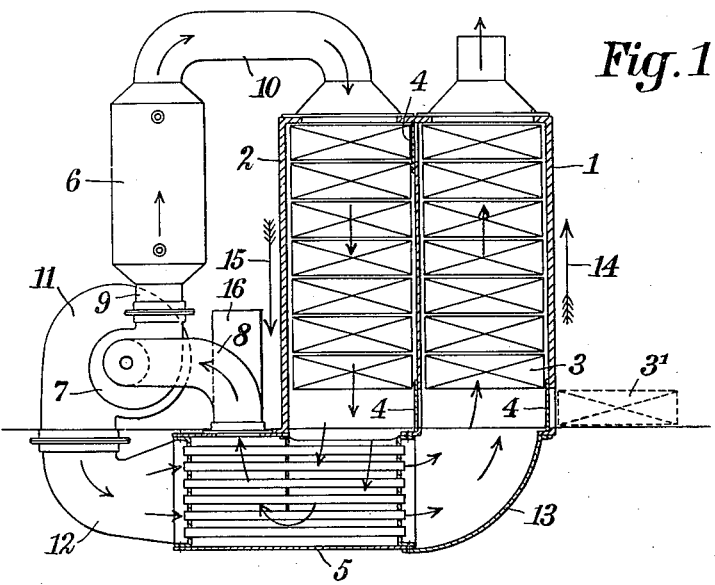

W. BRATKOWSKI.
PROCESS OF AND APPARATUS FOR DRYING WET MATERIAL.
APPLICATION FILED FEB. 3, 1910.

969,031.

Patented Aug. 30, 1910.

Witnesses:
John Murtagh
L. J. Murphy

Inventor:
Wladislaus Bratkowski
by Goepel & Goepel
Attorneys

UNITED STATES PATENT OFFICE.

WLADISLAUS BRATKOWSKI, OF BERLIN, GERMANY.

PROCESS OF AND APPARATUS FOR DRYING WET MATERIAL.

969,031.  Specification of Letters Patent.  Patented Aug. 30, 1910.

Application filed February 3, 1910. Serial No. 541,847.

*To all whom it may concern:*

Be it known that I, WLADISLAUS BRATKOWSKI, a subject of the German Emperor, and residing at Berlin, Germany, have invented a certain new and useful Improved Process of and Apparatus for Drying Wet Material, of which the following is a specification.

My invention relates to drying wet material, and a primary object is to provide an improved process of drying wet material by means of flowing hot air.

The essence of my process consists in the peculiar mode of utilizing the heat contained in the air which is used and saturated with moisture.

Heretofore it was attempted to utilize again for the drying process the heat present in the discharging air by causing the cold air entering into the drying machine to flow in an exchange of heat device past the discharging air, thus preliminarily heating the same to a small extent. Only one single current of air was employed, which began and ended at opposite places separated by walls in the device for exchange of heat. This arrangement had defects which did not allow of a general employment of known devices for exchange of heat. Namely, if the discharging air was at a low temperature, say 30° to 35° C. it was not worth while to employ an exchange of heat device, as the small difference of temperature between the entering and issuing air retarded the exchange of heat and rendered necessary a voluminous, expensive exchange of heat device for completely absorbing the heat. If, on the contrary, the discharging air was at a higher temperature, say 50° to 60° C. or 60° to 80° C., it was quite impossible to render useful the heat stored therein by employing the known process referred to because the highly heated air had, of course, to possess a less velocity of flow in order that it might become saturated, while large quantities of cold air were requisite for cooling it. This necessary difference in the velocity of flow at the beginning and end of the same current of air formed an insurmountable obstacle in employing exchange of heat devices. Nevertheless, precisely the high temperatures, which are absolutely necessary for rapidly completely drying many goods, do not admit of economical operation without recovery of the active and latent heat contained in the discharged air.

Now according to my invention I recover the heat from the issuing air by employing two separate currents of air, one of which flows through a definite portion of the material to be dried and is heated by an exterior source of heat, as *e. g.* a tubular heater or the like, whereas the other current flows through another portion of the material and obtains its heat in an exchange of heat device from the directly-heated first current of air. The two currents of air, of which the first has just flowed through the material to be dried and is saturated with heat and moisture while the other is just entering into the machine, flow past one another in this manner separated by walls, and their temperatures are equalized, because the one loses its heat and the other takes it up.

My process for drying various materials can be employed in manifold ways. One definite device does not come into question; on the contrary, all drying apparatuses employed in the art for the most various purposes can be used for carrying my process into practice.

The two currents of air may both be through currents *i. e.* entering into and passing out of the machine, or the directly-heated current may be employed circulating in the machine, while only the other current which cools the former passes out of the machine. In the former instance the directly-heated current of air flows, after passing through the heater, through a portion of the material to be dried and, after leaving the material, into the exchange of heat device which can be made preferably of copper or brass in the manner of a tubular heater. In this exchange of heat device the hot current of air saturated with moisture plays the same part as steam in a tubular steam heater. After leaving this exchange of heat device the cooled current of air flows into the open air. The second current of air, on the contrary, first flows through the exchange of heat device, receives heat here from the first current of air and enters into the drying apparatus in order to flow through another portion of the material to be dried and afterward leave the machine.

My process may suitably be modified by causing the directly-heated current of air to circulate, *i. e.* not allowing it to pass into the open air, and after it has passed through the exchange of heat device allowing it to enter cooled and dried at once into the tubular heater in order that it may perform work again in the machine. The other current of air, on the contrary, must be employed as a through current as described above.

The figures show, by way of example, two apparatuses by which the process can be illustrated.

Figure 2:
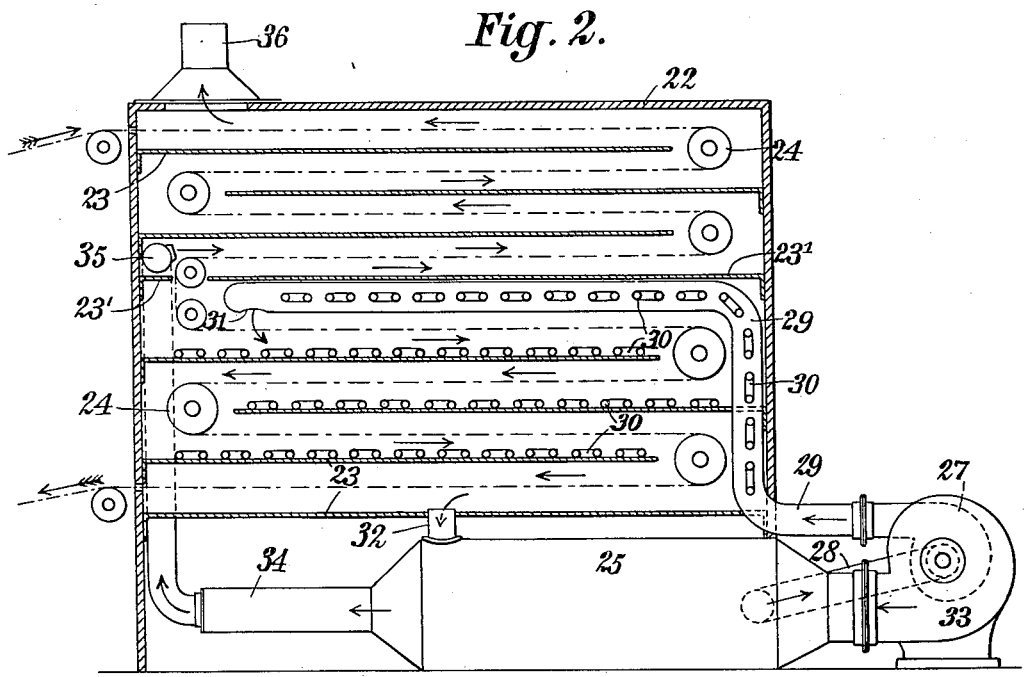

Figure 1 represents a shelf-drier in which pieces like yarns, fruit, grain and the like, can be dried, and Fig. 2 shows a machine for drying textile fabrics.

As shown in Fig. 1, two different chambers 1 and 2 are employed, in which shelves 3 are so arranged that in the chamber 1 the shelves pass in upward direction according to the arrows, while in the other chamber they pass in downward direction, while the charging and emptying takes place at the point $3^1$. Slides 4 may be opened and the shelves moved forward for charging or removing, but said slides are otherwise kept closed. The heat-exchanger 5, shown in section, is made in the manner of the usual air-pipe heaters. An air-heater 6, shown in elevation, heats the air which is forced to circulate, by the ventilator 7, through the chamber 2, the suction-pipe 8 and the conducting tubes 9 and 10. Another larger ventilator 11 draws in, from the outside air, the cooling air-current which is forced through the conducting tube 12, the heat-exchanger 5, the conducting tube 13 and the chamber 1 to the outside air. The operation of this form of drier is as follows: While the shelves are being periodically moved in the direction of the arrows 14 and 15 in the chambers, the ventilator 7 forces air from the lower part of the chamber 2 through the heat-exchanger 5 to the suction-tube 8 and forces the same through the tube 9 to the air-heater 6 and through the tube 10 into the upper end of the chamber 2. The air circulates thereby constantly through the chamber 2, is saturated in the latter with moisture, the larger part of which moisture leaves the air when the air is cooled in the heat-exchanger. That is to say, the air is cooled and dried, and is then returned through the air-heater 6 so as to take up again its work of drying in the chamber 2. The cooling of the circulating air is accomplished in the heat-exchanger 5 by the ventilator 11, which draws in cool outside air and conducts the same through the tube 12 into the interior of the heat-exchanger 5, where it abstracts the heat from the circulating hot air and is used in the chamber 1 for the preliminary heating of the substances to be dried. If the hot-air current is not required for circulation it is conducted through the tube 16 into the atmosphere.

Fig. 2 shows an apparatus for drying textile fabrics. In this apparatus the fabric enters through an opening in the upper corner of the closed casing 22, which is divided by means of alternating horizontal partitions into a number of spaces through which the fabrics are drawn over guide-rollers in zigzag course, and is taken out of the apparatus at the lower corner, as shown by the arrows in Fig. 2. The partition $23^1$ separates the entire casing into two separate chambers for utilizing the double air-current employed. Through the lower chamber the hot-air current passes, while the upper chamber is supplied with a partly heated cold-air current. The ventilator 27 sucks the dried and cooled circulating air through the heat-exchanger 25 through the tube 28 and forces it through the tube 29 into the casing so as to circulate in the direction opposite to the movement of the fabric to be dried. The air is gradually heated by contact with the heating tubes 30 and acts at 31 on the fabric. The air is drawn off at 32 from the casing, after it has passed in zigzag course through the lower part of the casing, and returned to the heat-exchanger 25 and from the same through the exhaust-fan 27. The ventilator 33 forces the cold air through the heat-exchanger 25 and the tube 34 to a tube 35, which is located in the casing, from which it passes through openings in the direction of the arrows in upward direction and through the outlet 36 into the atmosphere. In this case, instead of one circulating air-current, two air-currents can be used. The essential feature in this apparatus is that the hot-air current after passing through the casing gives off its latent and sensible heat to the cool air-current in the heat-exchanger 25.

As already stated, the execution of my process is not bound to one definite apparatus; as is generally customary in the art of drying, the wet material may travel through the machine, and the current of air may flow along one constant path; or the material may remain stationary and the currents of air be so directed that sometimes they flow past one part of goods and sometimes past another.

Whether the directly-heated or the indirectly-heated current of air is used for preliminarily drying or completely drying the goods is of no importance for the essence of my invention. In those instances when the goods are to come out of the machine completely dried, as e. g. in the case of dried fruit and vegetables, the through current of air is preferable for complete drying and the circulating, on the contrary, for preliminary drying; in the textile and paper industry, however, when the goods must preferably have a certain customary degree of moisture as they leave the machine, the reverse employment of the mentioned currents of air is preferable. Lastly, the circulating current of air may be made use of for evaporating the moisture from the central portion of the goods in the machine, while the through current of air is split in the machine into two currents and is employed both for complete and preliminary drying.

In executing my process the directly-heated current of air should have as high temperature as possible. The more nearly it approaches to 100° C. the more favorable is the operation of the plant. When evaporating a definite quantity of water only a very weak current of air requires to be sent through the heater, while, on the other hand, the quantity of cold air requisite for precipitating the vapor contained in the discharged air can flow at an optional velocity through the exchange of heat device.

I claim:

1. The herein described process of drying material consisting in forcing a current of air in a cycle through the material to be dried, imparting heat to the air just before it enters the material, transferring heat from the air as it leaves the material to a second current of air, and passing said second current through another portion of the material after the transfer.

2. In a drying apparatus the combination of means for creating two separate currents of air one of which travels in a cycle, means for heating the cycle current, means for passing said currents under the conductive influence of each other, and means for subjecting the material to be dried to the action of said currents.

In testimony, that I claim the foregoing as my invention, I have signed my name in presence of two subscribing witnesses.

WLADISLAUS BRATKOWSKI.

Witnesses:
 HENRY HASPER,
 WOLDEMAR HAUPT.